(12) United States Patent
Jhang et al.

(10) Patent No.: US 10,713,517 B2
(45) Date of Patent: Jul. 14, 2020

(54) REGION OF INTEREST RECOGNITION

(71) Applicant: HIMAX TECHNOLOGIES LIMITED, Tainan (TW)

(72) Inventors: Pei-Yu Jhang, Tainan (TW); Der Wei Yang, Tainan (TW)

(73) Assignee: HIMAX TECHNOLOGIES LIMITED (TW)

( * ) Notice: Subject to any disclaimer, the term of this patent is extended or adjusted under 35 U.S.C. 154(b) by 69 days.

(21) Appl. No.: 16/147,849

(22) Filed: Sep. 30, 2018

(65) Prior Publication Data
US 2020/0104623 A1    Apr. 2, 2020

(51) Int. Cl.
*G06K 9/32*    (2006.01)
*H04N 19/176*    (2014.01)
*G06K 9/62*    (2006.01)

(52) U.S. Cl.
CPC ......... *G06K 9/3241* (2013.01); *G06K 9/6215* (2013.01); *H04N 19/176* (2014.11)

(58) Field of Classification Search
CPC .. G06K 9/3241; G06K 9/6215; G06K 9/3233; H04N 19/176; H04N 19/172; H04N 19/174
See application file for complete search history.

(56) References Cited

U.S. PATENT DOCUMENTS

| | | | |
|---|---|---|---|
| 9,135,553 B2 | 9/2015 | Kato et al. | |
| 9,251,431 B2 | 2/2016 | Doepke et al. | |
| 9,424,493 B2 | 8/2016 | He et al. | |

FOREIGN PATENT DOCUMENTS

| | | | |
|---|---|---|---|
| CN | 105531988 A | 4/2016 | |
| CN | 105681795 A | 6/2016 | |

*Primary Examiner* — Christopher Wait
(74) *Attorney, Agent, or Firm* — Su IP Consulting

(57) ABSTRACT

An example method includes receiving the one or more image frames successively in time, wherein a first image frame is received before a second image frame in time and defining one or more blocks in each of the one or more image frames, wherein the first image frame includes a first block, and the second image frame includes a second block. The method also includes in response to the second block having a probability higher than a threshold to be associated with a region of interest (ROI), selecting the second block from the one or more blocks in the second image frame, and in response to the selected second block being associated with the first block, determining an ROI status of the second block to represent whether the second block includes any part of the ROI based on an ROI status of the first block.

19 Claims, 4 Drawing Sheets

REGION OF INTEREST RECOGNITION

BACKGROUND

Unless otherwise indicated herein, the approaches described in this section are not prior art to the claims in this application and are not admitted to be prior art by inclusion in this section.

Various techniques have been developed to recognize a region of interest (ROI) in an image signal. While some approaches, such as convolutional neural network (CNN), region CNN (R-CNN), faster R-CNN, and others, have been shown to sometimes outperform humans in detecting instances of semantic objects in digital images and/or videos, they remain computationally expensive.

It would therefore be desirable to provide methods and systems to recognize the ROI with improved efficiencies.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

The technical details set forth in the following description enable a person skilled in the art to implement one or more embodiments of the present disclosure.

Multi-layer neural networks, such as convolutional neural networks (CNNs) and their variations (e.g., region CNN (R-CNN), fast R-CNN, etc.), are increasingly used in image recognition systems and even in video analysis systems due to their low error rates of detecting and recognizing objects. However, given the number of operations required to perform on each pixel of an input image in different layers of CNN (e.g., convolutional layer, pooling layer, rectified linear layer, etc.) and also the various limitations imposed by CNN, various approaches have been proposed to further improve CNN.

In one example, U.S. Pat. No. 9,135,553 (hereinafter the "'553 Patent") proposes a specifically designed convolution operation circuit to perform high speed convolution operations.

In another example, U.S. Pat. No. 9,424,493 describes the shortcomings associated with the "artificial" requirement of needing a fixed-size input image for CNNs and proposes an approach to compute feature maps from an entire image and pool the features to generate fixed-length representations for training.

As has been shown, each of these known approaches attempts to address the limitations of CNNs by modifying some of the computations required in such networks. However, unlike the approaches disclosed in the present application, the known approaches fail to explore the ways to reduce the usage of CNNs under certain circumstances to lessen the impact of their limitations.

Furthermore, as discussed above, due to the number of operations required to operate on each pixel in multi-layer neural networks, image recognition using such networks can be challenging to implement, especially in thermally constrained mobile systems. Using such multi-layer neural networks to perform object recognition intelligently, as opposed to indiscriminately, can often help to save power.

Figure 1:
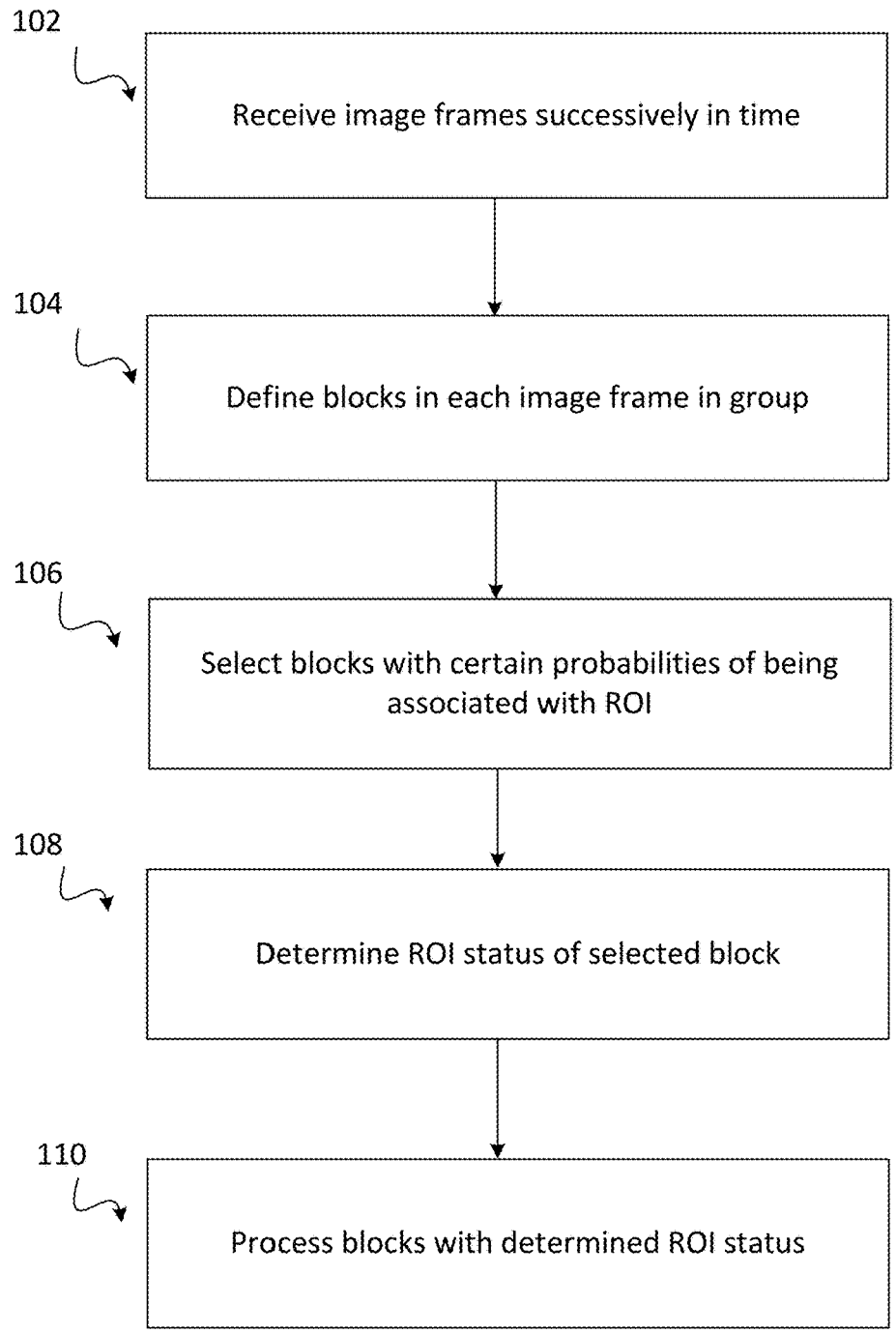
FIG. 1 illustrates a flowchart of method to recognize a region of interest (ROI) of an object in successive image frames of an image signal, in accordance with at least some embodiments of the present disclosure.

FIG. 1 illustrates a flowchart of method 100 to recognize a region of interest (ROI) of an object in successive image frames of an image signal, in accordance with at least some embodiments of the present disclosure. Method 100 may include one or more operations, functions or actions as illustrated by one or more of operations 102, 104, 106, 108 and/or 110. The various operations may be combined into fewer operations, divided into additional operations, and/or eliminated based upon the desired implementation.

Processing for method 100 may begin at operation 102, "receive image frames successively in time." For example, a first image frame may be received before a second image frame in time, and the second image frame may be received before a third image frame in time.

Operation 102 may be followed by operation 104, "define blocks in each image frame in group." In some embodiments, the processor is configured to define one or more blocks in each of the received image frames. In some embodiments, in any image frame, the defined blocks are non-overlapping, and each defined block has substantially the same size. The image frames may also be received and processed by a processor in groups. In some embodiments, the processor is configured to group a predetermined number of image frames that it receives successively in time. For instance, a first group may include three image frames that are received at time t, t+1, and t+2, and a second group may include three more image frames that are received at time t+3, t+4, and t+5. The predetermined number may vary depending on the processing efficiencies and/or capabilities of the processor. In a group consisting of a smaller number of image frames, given the temporal closeness of such image frames, the similarities and/or relatedness among the them in the group are likely higher, so that a processing result for one frame in the group may be used as a basis for processing the other frames in the same group to increase processing efficiencies. However, this gain in efficiency for processing groups with few image frames should be balanced with the increased total processing time to handle a greater total number of groups. One example range of this predetermined number of image frames in a group may be an integer from 2 to 8.

In some embodiments, a larger block may be defined in an image frame that precedes the other image frames in the group in time, a smaller block may be defined in another image frame that succeeds the other image frames also in the group in time. Additional explanations and examples are set forth below in conjunction with FIG. 2.

Operation 104 may be followed by operation 106, "select blocks with certain probabilities of being associated with ROI." In some embodiments, any block defined in operation 104 is processed to determine a probability of being associated with the ROI. This probability reflects the likelihood that the block includes any part of the ROI (e.g., a human face, a vehicle, etc.) The determination may be based on any technical feasible approaches. In some embodiments, the determination may be based on some quick and relatively resource-saving parameters, such as a level associated with one or more texture contents (e.g., texture of human faces, vehicles, etc.) and/or one or more edges (e.g., sharp changes in pixel values). In response to the probability being higher than a predetermined threshold, the processor is configured to select the block for further processing in operations 108 and 110. In response to the probability being less than or equal to the predetermined threshold, the processor is configured not to select the block for further processing so that multi-layer networks, such as CNNs and their variations, will not be utilized to process such a block.

Operation 106 may be followed by operation 108, "determine ROI status of selected block." As set forth above, the selected blocks have a higher probability of being associated with the ROI. In operation 108, the processor is configured to determine whether any of the selected blocks actually includes any part of the ROI. In some embodiments, the processor is configured to perform object recognition approaches via multi-layer networks, such as CNNs and their variations, to process a first set of selected blocks to determine whether any of the first set of selected blocks includes a part of the ROI. In response to the determination that a selected block indeed includes at least some of the ROI, the processor is configured to set the ROI status of the selected block to be "true" or "1." Otherwise, the ROI status of the selected block is set to be "false" or "0."

In some embodiments, the processor is configured to utilize the determined ROI status of the first set of selected blocks, instead of utilizing CNNs and their variations, to determine whether any of a second set of selected blocks includes a part of the ROI. In some embodiments, the determined ROI status of a larger block in an image frame may be used to determine the ROI status of a smaller block in another image frame to avoid incurring the resources associated with performing the CNN related operations. The physical location of the smaller block in its image frame may be similar to the physical location of the larger block in its image frame. In some other embodiments, the determined ROI status of a block in an image frame of a first group may also be used to determine the ROI status of a block in another image frame in a second group later in time. Additional explanations and examples are set forth below.

Operation 108 may be followed by operation 110, "process blocks with determined ROI status." In some embodiments, the processor is configured to process the blocks with status determined to be "true" or "1" in block 108 to detect and recognize the ROI. In some embodiments, some technical feasible approaches, for example, non-maximum suppression (NMS) may be used. In the NMS approach, a highest scoring window including a first set of blocks with the status determined to be "true" or "1" is selected, which is then assumed to indeed cover the ROI. Other windows (each including a plurality of blocks with status determined to be "true" or "1") too close to the selected window are suppressed. Out of the remaining windows, the next highest scoring window is then selected, and the steps set forth above are repeated until only the highest scoring window remains.

Figure 2:
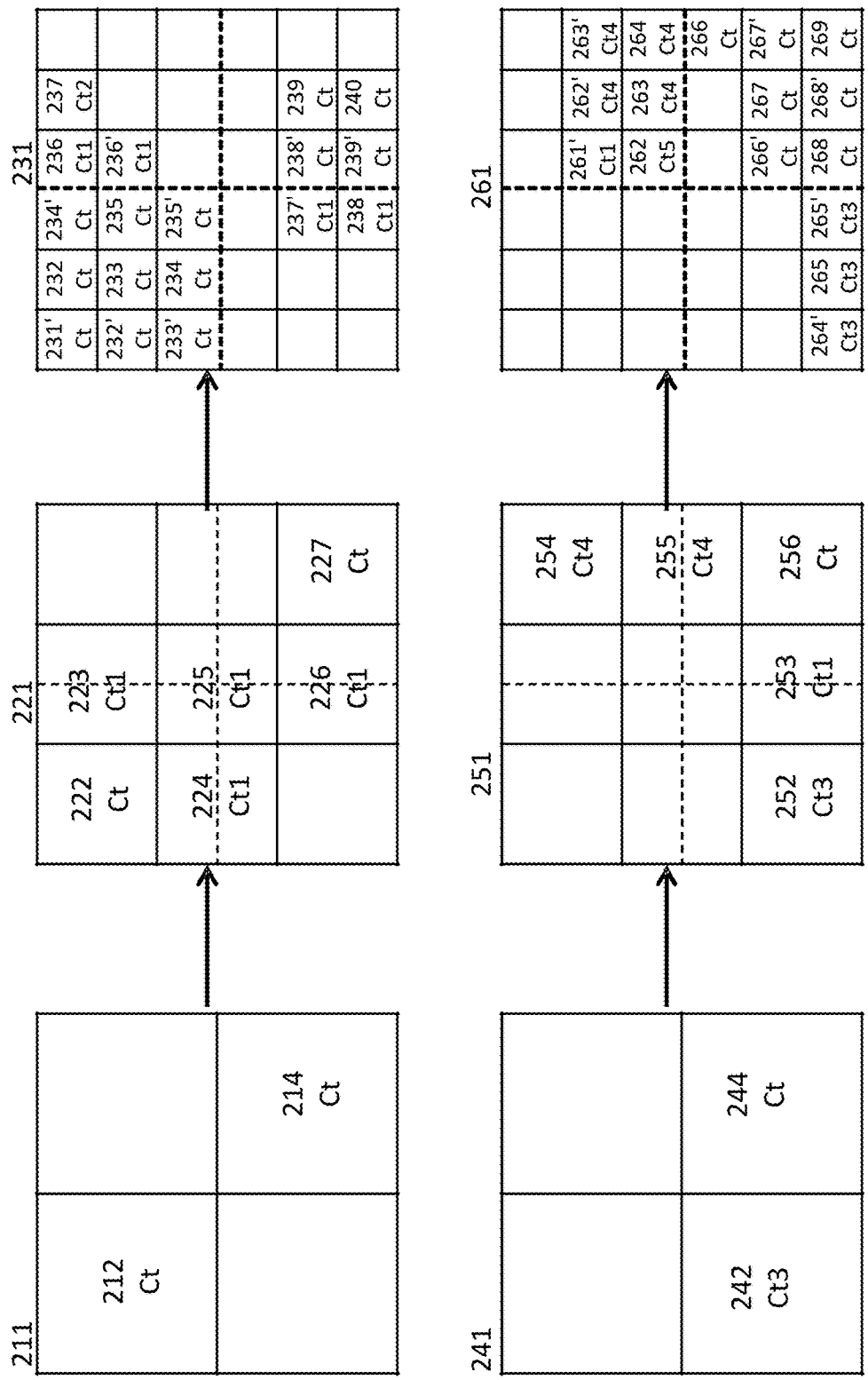
FIG. 2 is a schematic diagram illustrating a plurality of image frames in an image signal, in accordance with at least some embodiments of the present disclosure.

FIG. 2 is a schematic diagram illustrating a plurality of image frames in an image signal, in accordance with at least some embodiments of the present disclosure. In some embodiments, the image signal may include image frames 211, 221, 231, 241, 251 and 261. Image frames 211, 221, 231, 241, 251 and 261 are successive image frames received at time points of t, t+1, t+2, t+3, t+4 and t+5, respectively.

In some embodiments, suppose there is a pre-set rule that each group consists of 3 image frames. Frames 211, 221 and 231 belong to a first group of image frames, and frames 241, 251 and 261 belong to a second group of image frames.

For illustration purposes, in conjunction with block 104 "define blocks in each image frame in group" of FIG. 1, large non-overlapping blocks (e.g., 4 block) are defined in the image frame earliest in time in each group (e.g., image frame 211 in group 1 and image frame 241 in group 2). In addition, medium non-overlapping blocks (e.g., 9 blocks) are defined in the image frame succeeding the image frame earliest in time in each group (e.g., image frame 221 in group 1 and image frame 251 in group 2). Similarly, small non-overlap blocks (e.g., 36 blocks) are defined in the image frame latest in time in each group (e.g., image frame 231 in group 1 and image frame 261 in group 2).

In some embodiments, for illustration purposes, the sizes of the 4 blocks in image frames 211 and 241 are the same. For example, any of the 4 blocks may be defined by 81 pixels by 81 pixels. The sizes of the 9 blocks in image frames 221 and 251 may also be the same. For example, any of the 9 blocks may be defined by 36 pixels by 36 pixels. The sizes of the 36 blocks in image frames 231 and 261 may also be the same. For example, any of the 36 blocks may be defined by 9 pixels by 9 pixels.

In some embodiments, in conjunction with block 106, "select blocks with certain probabilities of being associated with ROI," some quick and relatively resource-saving approaches are used on each block to determine the probability of the block being associated with the ROI. In response to the probability being higher than a threshold, the block will be selected. To illustrate, blocks 212 and 241 are selected among the blocks defined in image frame 211 in FIG. 2. Similarly, blocks 242 and 244 are selected among the blocks defined in image frame 241. Blocks 222, 223, 224, 225, 226 and 227 are selected among the blocks defined in image frame 221. Blocks 252, 253, 254, 255 and 256 are selected among the blocks defined in image frame 251. Blocks 231', 232, 232', 233, 233', 234, 234', 235, 235', 236, 236' 237, 237', 238, 238', 239, 239' and 240 are selected among the blocks defined in image frame 231. Blocks 261', 262, 262', 263, 263', 264, 264', 265, 265', 266, 266', 267, 267', 268, 268', 269 are selected among the blocks defined in image frame 261.

In some embodiments, in conjunction with block 108 "determine ROI status of selected block," object recognition approaches via multi-layer neural networks (e.g., CNN related operations) are used to determine the ROI status of the selected blocks.

However, as set forth above, these approaches are resource-demanding. Therefore, under certain circumstances, taking advantage of the already determined ROI status of a first block in the first image frame to determine the ROI status for a second block in the second image frame later in time avoids executing these resource-demanding approaches. In some embodiments, the second image frame may be in the same group as the first image frame. In some other embodiments, the second image frame and the first image frame may be in different groups.

Scenario I—the Image Frames Successive in Time are in the Same Group

A. Selected Blocks in Image Frame 211

Suppose at time point t, the ROI status of selected blocks 212 and 214 in image frame 211 has been determined as Ct by CNN related operations.

B. Selected Blocks in Image Frame 221

To determine the ROI status of selected blocks 222, 223, 224, 225, 226 and 227 in image frame 221, in one embodiment, when a block (e.g., 36 pixels by 36 pixels block 222 located at the upper left-hand corner) in image frame 221 is fully covered by a spatially corresponding first block (e.g., 81 pixels by 81 pixels block 212 also located at the upper left-hand corner) in image frame 211, which precedes image frame 221 in time, the ROI status of block 222 may be determined to be the same as the ROI status of block 212 without having to perform the CNN-related operations. Accordingly, the ROI status of block 222 is determined to also be Ct, as shown in FIG. 2. Similarly, block 227 in image frame 221 is also fully covered by a spatially corresponding range block 214 in image frame 211. Therefore, the ROI status of block 227 is determined to also be Ct.

In some embodiments, for selected blocks 223, 224, 225 and 226 in image frame 221, since they are not fully covered by the spatially corresponding blocks 212 and 214 of image frame 211, similar to determining the ROI status of blocks 212 and 214 at time point t, the CNN related operations are then used at time point t+1 to determine the ROI status of blocks 223, 224, 225 and 226. This ROI status at t+1 is illustrated as Ct1 in FIG. 2.

C. Selected Blocks in Image Frame 231

To determine the ROI status of blocks 231', 232, 232', 233, 233', 234, 234', 235, 235', 236, 236' 237, 237', 238, 238', 239, 239' and 240 in image frame 231, in one embodiment, when a selected block (e.g., any of 9 pixels by 9 pixels blocks 213', 232, 232', 233, 233', 234, 234', 235 and 235') in image frame 231 is fully covered by a spatially corresponding block (e.g., 81 pixels by 81 pixels block 212) in image frame 211 (i.e., the image frame earliest in time and in the same group as image frames 221 and 231), the ROI status of the selected block may be determined to be the same as the ROI status of block 212 without having to perform the CNN-related operations. Therefore, the ROI status of blocks 213', 232, 232', 233, 233', 234, 234', 235 and 235' is determined to be Ct, as shown in FIG. 2. Similarly, when any of blocks 238', 239, 239' and 240 in image frame 231 is fully covered by a spatially corresponding block 214 in image frame 211, the ROI status of blocks 238', 239, 239' and 240 is determined to also be Ct.

After all the determined ROI status in image frame 211 has been applied, the ROI status determined in image frame 221 may also be used to determine the ROI status of the selected blocks in image frame 231. In some embodiments, after the ROI status of blocks 213', 232, 232', 233, 233', 234, 234', 235, 235', 238', 239, 239' and 240 in image frame 231 is determined as Ct, the ROI status of blocks 236, 236' 237, 237' and 238 still needs to be determined. To take advantages of the ROI status determined in image frame 221, when a selected block (e.g., any of 9 pixels by 9 pixels blocks 236, 236', 237' and 238) in image frame 231 is fully covered by spatially corresponding blocks (e.g., 36 pixels by 36 pixels blocks 223 and 226, respectively) in image frame 221 (i.e., the image frame later in time than image frame 211 but earlier in time than image frame 231), the ROI status of blocks 236, 236', 237' and 238 may be determined to be the same as the ROI status of blocks 223 and 226 in image frame 221, respectively, without having to perform the CNN-related operations. Therefore, the ROI status of blocks 236, 236', 237' and 238 is determined to be Ct1.

In some embodiments, after having determined that selected block 237 in image frame 231 is not fully covered by any spatially corresponding block in either image frames 211 or 221 in the same group, the CNN-operations are then used to determine the ROI status of block 237 in image frame 231. As shown in FIG. 2, the ROI status of block 237 is determined to be Ct2 at the time point t+2. Accordingly, the total resources required to determine the ROI status of the selected blocks in image frames 221 and 231 are significantly reduced.

Scenario II—the Image Frames Successive in Time are in Different Groups.

In some embodiments, image frames 211, 221 and 231 are in the first group, and image frames 241, 251 and 261 are in the second group. The first group of image frames is received before the second group of image frames. Also, image frame 241 is the earliest in time frame in the second group, and image frame 261 is the latest in time frame in the second group. Although the image frames are in different groups, especially with the temporal closeness, they may still be related to one another. In some embodiments, image frame 211 of the first group may correspond to image frame 241 of the second group, and the blocks defined in image frame 211 may have the same sizes (e.g., 81 pixels by 81 pixels) as the blocks defined in the corresponding image frame 241. Similarly, image frame 221 of the first group may correspond to image frame 251 of the second group, and the blocks defined in image frame 221 may have the same sizes (e.g., 36 pixels by 36 pixels) as the blocks defined in the corresponding image frame 251. Image frame 231 of the first group may correspond to image frame 261 of the second group, and the blocks defined in image frame 231 may have the same sizes (e.g., 9 pixels by 9 pixels) as the blocks defined in the corresponding image frame 261.

A. Selected Blocks in Image Frame 241

In some embodiments, although image frames 211 and 241 are in two different groups, the determined ROI status of the selected block 214 in image frame 211, which precedes image frame 241 in time, can be used to determine the ROI status for the spatially corresponding block 244 in image frame 241, since block 214 and block 244 are both in the lower right-hand corner of their respective image frames, and block 244 is fully covered by block 214. Therefore, as shown in FIG. 2, the ROI status of block 244 may be determined to be Ct without having to perform the CNN-related operations.

However, as shown in FIG. 2, the block in image frame 211 spatially corresponding to block 242 in image frame 241 does not have a determined ROI status. Therefore, to determine the ROI status of block 242, in some embodiments, the CNN-related operations are utilized. As shown in FIG. 2, the ROI status of selected block 242 is determined to be Ct3 at time point t+3.

B. Selected Blocks in Image Frame 251

In some embodiments, to determine the ROI status of the selected blocks in image frames 251 and 261 of the second group, the same approaches set forth above associated with determining the ROI status of the selected blocks in image frames 221 and 231 of the first group may be used. In other words, when selected blocks 252 and 256 (e.g., 36 pixels by 36 pixels) in image frame 251 are fully covered by the spatially corresponding blocks 242 and 244 (e.g., 81 pixels by 81 pixels) in image frame 241, respectively, the ROI status of blocks 252 and 256 may be determined to be the same as the determined ROI status of blocks 242 and 244 as Ct3 and Ct, respectively, without having to perform the CNN-related operations.

To determine the ROI status of the remaining selected blocks 253, 254 and 255 in image frame 251, although block 253 is not fully covered by any spatially corresponding block in image frame 241, block 253 has a corresponding block 226 in image frame 221 of the first group. As shown in FIG. 2, block 226 has a determined ROI status indicated as Ct1. Since block 253 is fully covered by block 226, the ROI status of block 253 may be determined to also be Ct1 without having to perform the CNN-related operations.

As for selected blocks 254 and 255 in image frame 251, they are not fully covered by any block with a determined ROI status in image frame 241 in the same group 2 or any block with a determined ROI status in image 221 in the first group. Thus, the CNN-related operations are performed at time point t+4 to determine the ROI status of selected blocks 254 and 255, and the determined ROI status is represented as Ct4 as shown in FIG. 2.

C. Selected Blocks in Frame 261

When a selected block (e.g., any of 9 pixels by 9 pixels blocks 264', 265 and 265') in image frame 261 is fully covered by a spatially corresponding block (e.g., 81 pixels by 81 pixels block 242) in image frame 241 (i.e., the image frame earliest in time in the second group), the ROI status of the selected block may be determined to be the same as the ROI status of block 242 without having to perform the CNN-related operations. As shown in FIG. 2, the ROI status of blocks 264', 265 and 265' is determined to be Ct3. Similarly, since the selected blocks 266, 266', 267, 267', 268, 268' and 269 in image frame 261 are fully covered by the spatially corresponding block 244 in image frame 241, the ROI status of blocks 266, 266', 267, 267', 268, 268' and 269 is determined to be the same as the determined ROI status of block 244, or Ct.

After all the determined ROI status in image frame 241 has been applied, the ROI status determined in image frame 251 may also be used to determine the ROI status of the selected blocks in image frame 261. In some embodiments, after the ROI status of blocks 264', 265' 265', 266, 266', 267, 267', 268, 268' and 269 is determined as Ct3 and Ct, the ROI status of blocks 261', 262, 262', 263, 263' and 264 still needs to be determined. To take advantages of the ROI status determined in frame 251, when a selected block (e.g., any of 9 pixel by 9 pixel blocks 262', 263', 263 and 264) in image frame 261 is fully covered by spatially corresponding blocks (e.g., 36 pixels by 36 pixels blocks 254 and 255, respectively) in image frame 251 (i.e., image frame later in time than image frame 241 but earlier in time than image frame 261), the ROI status of blocks 262', 263', 263 and 264 may be determined to be the same as the ROI status of blocks 255 and 254 in image frame 251, respectively, without having to perform the CNN-related operations. Therefore, the ROI status of blocks 262', 263', 263 and 264 is determined to be Ct4.

In some embodiments, although selected blocks 261' in image frame 261 is determined not to be fully covered by a spatially corresponding block with the determined ROI status in image frames 241 and 251 of the second group, block 261' has a spatially corresponding block 236', having the determined ROI status of Ct1, in image frame 231 of the first group. Therefore, similar to determining the ROI status of block 244 based on the determined ROI status of block 214, the ROI status of block 261' may be determined based on the determined ROI status of block 236', or Ct1, without having to perform the CNN-related operations.

In some embodiments, after having determined that selected block 262 in image frame 261 is neither fully covered by any spatially corresponding block in either image frames 241 and 251 in the same group nor fully covered by any block with the determined ROI status in the corresponding image frame 231 of the first group, the CNN-operations are then used to determine the ROI status of block 262 in image frame 261. As shown in FIG. 2, the ROI status of block 262 is determined to be Ct5 at the time point t+5.

In summary, in some embodiments, the process to determine the ROI status of a selected block in an image frame (e.g., block 262 in image frame 261) may follow the following sequence: 1) reference the blocks with the determined ROI status in the earlier received image frames in the same group (e.g., the second group), starting from the earliest received frame (e.g., image frame 241 in the second group); 2) after all the relevant blocks in the earlier image frames in the same group (e.g., image frames 241 and 251) have been checked, reference the blocks with the determined ROI status in the corresponding image frame in the different group (e.g., image frame 231 of the first group); and 3) if there is still no corresponding block with the determined ROI status, perform the CNN-related operations to determine the ROI status for this selected block. Since the image frames are received successively in time, the time difference between a pair of image frames in the same group is less than the time difference between a pair of image frames in the different groups. In other words, using FIG. 2 as an example, the time difference between image frames 241 and 251 in the second group is less than the time difference between image frame 251 and image frame 221. Thus, the determined ROI status of block 244 in image frame 241 and block 256 in image frame 251 is more likely to remain the same than the determined ROI status of block 227 in image frame 221 and block 256 in image frame 251.

Figure 3:
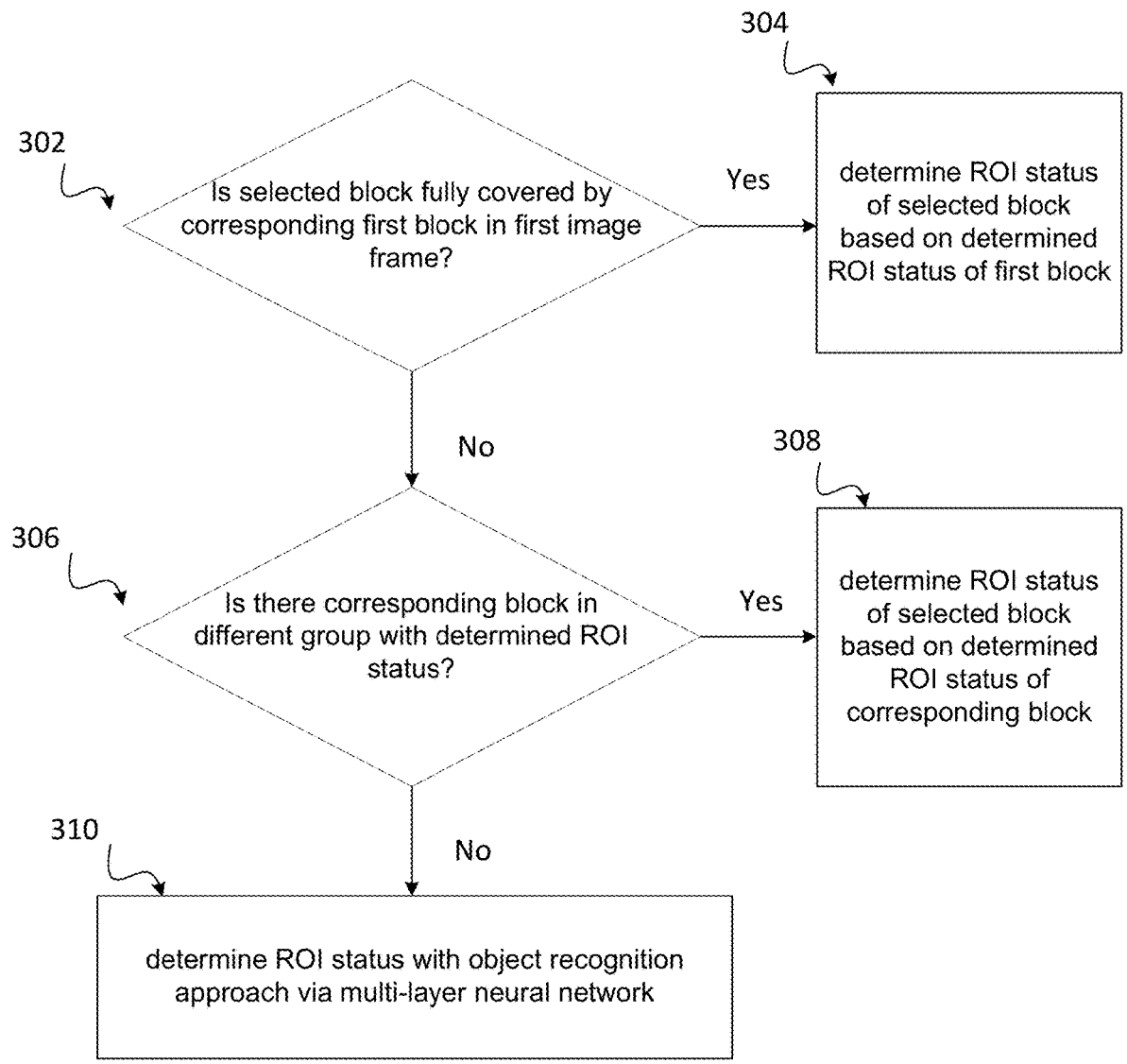
FIG. 3 illustrates a flowchart of method to determine an ROI status of blocks in successive image frames of an image signal, in accordance with at least some embodiments of the present disclosure.

FIG. 3 illustrates a flowchart of method 300 to determine the ROI status of the selected blocks in successively received image frames of an image signal, in accordance with at least some embodiments of the present disclosure. In some embodiments, the successively received image frames may be in the same or different groups. Method 300 may include one or more operations, functions or actions as illustrated by one or more of operations 302, 304, 306, 308 and/or 310. The various operations may be combined into fewer operations, divided into additional operations, and/or eliminated based upon the desired implementation. In some embodiments, method 300 performs operations associated with "determine ROI status of selected block" illustrated in operation 108.

Processing for method 300 may begin at operation 302, "is selected block fully covered by corresponding first block in first image frame?" As set forth above, to determine the ROI status of a selected block in a second image frame, operation 302 determines whether the selected block is fully covered by the corresponding first block in a first image frame, where the first image frame and the second image frame belong to the same group. In some embodiments, the first image frame precedes the second image frame in time in the group.

In response to the determination that the selected block is fully covered by the corresponding first block in the first image frame, operation 302 may be followed by operation 304, "determine ROI status of selected block based on determined ROI status of first block." For example, in conjunction with FIG. 2, blocks 252 and 256 in image frame 251 fully covered by spatially corresponding blocks 242 and 244 of image frame 241, respectively. Therefore, the ROI status of block 252 is determined based on the determined ROI status of block 242 (i.e., Ct3). Similarly, the ROI status of block 256 is determined based on the determined ROI status of block 244 (i.e., Ct). Accordingly, in operation 304, the CNN-related operations are not performed to determine the ROI status.

In response to the determination that the selected block is not fully covered by a corresponding first block in a first image frame, operation 302 may be followed by operation 306, "is there corresponding block in different group with determined ROI status?" In some embodiments, the selected block may have a corresponding block in a corresponding image frame in another group. In response to the corresponding block in the image frame belonging to the different group having the determined ROI, operation 306 may be followed by operation 308, "determine ROI status of selected block based on determined ROI status of corresponding block." In some embodiments, a similarity comparison (e.g., sum of absolute differences operations) between the selected block and the corresponding block may be performed to determine whether the corresponding block is similar to the second block. In some other embodiments, for example, in conjunction with FIG. 2, block 253 in image frame 251 is not fully covered by blocks 242 and 244 in image frame 241. However, block 253 has a corresponding block 226 in corresponding image frame 221 with the determined ROI status, and image frame 221 belongs to a different group. Therefore, the ROI status of block 253 can be determined based on the determined ROI status of block 226 (i.e., Ct/). Accordingly, in operation 308, CNN-related operations are not performed to determine the ROI status.

In response to the determination that operation 306 returns a negative response, operation 306 may be followed by block 310, "determine ROI status with object recognition approach via multi-layer neural network." For example, in conjunction with FIG. 2, selected blocks 254 and 255 in image frame 251 are not fully covered the spatially corresponding blocks in image frame 241 with the determined ROI status. Their corresponding blocks in image frame 221 in a different group also do not have the determined ROI status. Therefore, in block 310, the ROI status of blocks 254 and 255 are determined with an object recognition approach via a multi-layer neural network such as CNNs and their variations.

Figure 4:
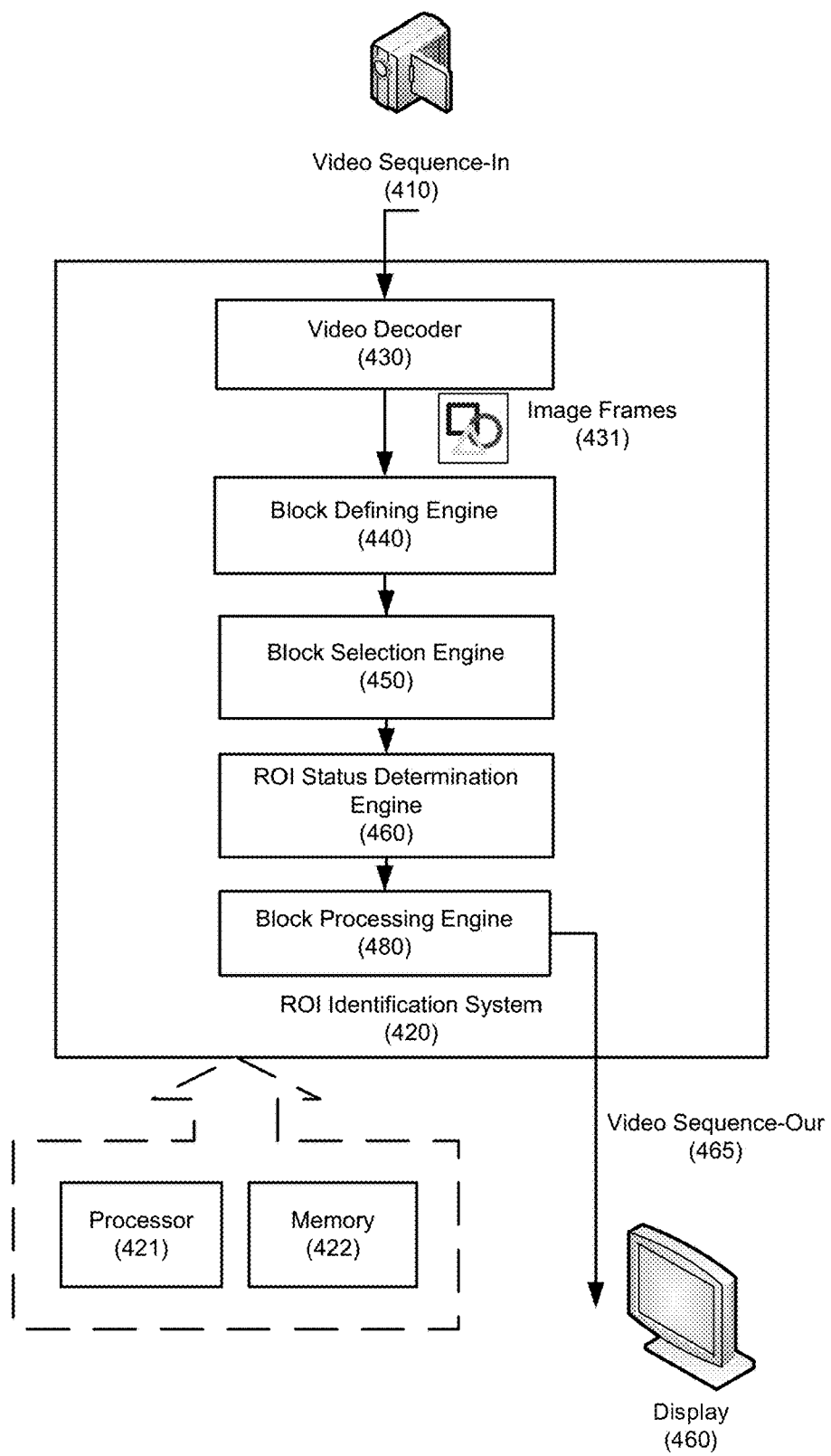
FIG. 4 illustrates a block diagram of a system configured to recognize the ROI of an object in successive image frames of an image signal, in accordance with at least some embodiments of the present disclosure.

FIG. 4 shows a block diagram of an illustrative embodiment of a system configured to recognize the ROI of an object in successively received image frames of an image signal. In particular, ROI recognition system 420 may be configured to process video sequence-in 410 and generate video sequence-out 455 including the determined ROI for display 460 to display. ROI recognition system 420 may be configured to include, without limitation, video decoder 430, block defining engine 440, block selection engine 450, ROI status determination engine 460, block processing engine 480, processor 421, and/or a memory 422.

In some embodiments, video sequence-in 410 may correspond to a video stream. Video decoder 430 may decompress and decode the video stream and extract successive image frames 431. One or more the image frames 431 may include the ROI.

Image frames 431 may be then processed by block defining engine 440, block selection engine 450 and ROI status determination engine 460. In conjunction with FIG. 1, block defining engine 440 may perform operation 104. In some embodiments, block selection engine 450 is configured to perform operation 106. In some other embodiments, ROI status determination engine 460 is configured to perform operation 108, and block processing engine 480 is configured to perform operation 110.

In some embodiments, in conjunction with FIG. 1, ROI identification system 420 may utilize processor 421 to interact with block defining engine 440, block selection engine 450, ROI status determination engine 460 and/or block processing engine 480 to perform operations 102, 104, 106, 108 and/or 110. Processor 421 may be a microprocessor, graphics processing unit, or any processing unit that executes commands based on programmable instructions. In some embodiments, the processor 421 may utilize memory 422 to execute the programmable instructions and store the intermediate processing results of block defining engine 440, block selection engine 450, ROI status determination engine 460 and/or block processing engine 480 for further processing with any of the engines set forth above in ROI identification system 420. Memory 422 may be in any form of non-transitory computer-readable storage medium including, but not limited to, random access memory (RAM), read-only memory (ROM), flash memory, conventional magnetic or optical disks, tape drives, or a combination of such devices.

Some examples of the display 460 may include, without limitation, a computer monitor, a device screen, a television, or a projector.

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method to recognize a region of interest (ROI) in one or more image frames in an image signal, comprising:
   receiving the one or more image frames successively in time, wherein a first image frame is received before a second image frame in time;
   defining one or more blocks in each of the one or more image frames, wherein the first image frame includes a first block, and the second image frame includes a second block;
   in response to the second block having a probability higher than a threshold to be associated with the ROI, selecting the second block from the one or more blocks in the second image frame;
   in response to the selected second block being associated with the first block, determining an ROI status of the second block to represent whether the second block includes any part of the ROI based on an ROI status of the first block; and
   in response to the selected second block not being associated with the first block, determining the ROI status of the second block with an object recognition approach via a multi-layer neural network.

2. The method of claim 1, wherein the probability of the second block being associated with the ROI is determined based on one or more of a level associated with texture contents and edges in the second block.

3. The method of claim 1, wherein the one or more blocks defined in any of one or more image frames are non-overlapping and have substantially the same size.

4. The method of claim 1, wherein the first image frame and the second image frame belong to a first group, and the defining further comprises defining the first block in the first image frame to be larger in size than the second block in the second image frame.

5. The method of 4, wherein the selected second block being associated with the first block is determined based on a physical location of the selected second block in the second image frame matching a physical location of the first block in the first image frame and the second block being fully covered by the first block.

6. The method of claim 1, wherein the selected second block being associated with the first block is determined based on a similarity between the selected second block and the first block.

7. The method of claim 1, further comprising:
receiving a third image frame and a fourth image frame, wherein the second image frame is received before the third image frame in time, the third image frame is received before the fourth image frame in time, the third image frame includes a third block, the fourth image frame includes a fourth block, and the defining further comprises:
defining the first block in the first image frame to be larger in size than the second block in the second image frame;
defining the third block in the third image frame to have substantially same size as the first block in the first image frame; and
defining the fourth block in the fourth image frame to have substantially same size as the second block in the second image frame, wherein the first image frame and the second image frame are in a first group, and the third image frame and the fourth image frame are in a second group.

8. The method of claim 7, further comprising: prior to performing the object recognition approach via the multi-layer neural network, determining whether the selected second block is associated with the fourth block.

9. A non-transitory computer-readable storage medium that includes a set of instructions which, in response to execution by a processor of a computing system, causes the processor to perform a method to recognize a region of interest (ROI) in one or more image frames in an image signal, the method comprising:
receiving the one or more image frames successively in time, wherein a first image frame is received before a second image frame in time;
defining one or more blocks in each of the one or more image frames, wherein the first image frame includes a first block, and the second image frame includes a second block;
in response to the second block having a probability higher than a threshold to be associated with the ROI, selecting the second block from the one or more blocks in the second image frame;
in response to the selected second block being associated with the first block, determining an ROI status of the second block to represent whether the second block includes any part of the ROI based on an ROI status of the first block; and
in response to the selected second block not being associated with the first block, determining the ROI status of the second block with an object recognition approach via a multi-layer neural network.

10. The non-transitory computer-readable storage medium of claim 9, wherein the probability of the second block being associated with the ROI is determined based on one or more of a level associated with texture contents and edges in the second block.

11. The non-transitory computer-readable storage medium of claim 9, wherein the one or more blocks defined in any of one or more image frames are non-overlapping and have substantially the same size.

12. The non-transitory computer-readable storage medium of claim 9, wherein the first image frame and the second image frame belong to a first group, and the defining further comprises defining the first block in the first image frame to be larger in size than the second block in the second image frame.

13. The non-transitory computer-readable storage medium of claim 12, wherein the selected second block being associated with the first block is determined based on a physical location of the selected second block in the second image frame matching a physical location of the first block in the first image frame and the second block being fully covered by the first block.

14. The non-transitory computer-readable storage medium of claim 9, wherein the selected second block being associated with the first block is determined based on a similarity between the selected second block and the first block.

15. The non-transitory computer-readable storage medium of claim 9 that includes additional instructions which, in response to execution by the processor, causes the processor to:
receive a third image frame and a fourth image frame, wherein the second image frame is received before the third image frame in time, the third image frame is received before the fourth image frame in time, the third image frame includes a third block, the fourth image frame includes a fourth block, and the defining further comprises:
define the first block in the first image frame to be larger in size than the second block in the second image frame;
define the third block in the third image frame to have substantially same size as the first block in the first image frame; and
define the fourth block in the fourth image frame to have substantially same size as the second block in the second image frame, wherein the first image frame and the second image frame are in a first group, and the third image frame and the fourth image frame are in a second group.

16. The non-transitory computer-readable storage medium of claim 15 that includes additional instructions which, in response to execution by the processor, causes the processor to:
prior to performing the object recognition approach via the multi-layer neural network, determine whether the selected second block is associated with the fourth block.

17. An apparatus configured to recognize a region of interest (ROI) in one or more image frames in an image signal, comprising:
a processor;
a video decoder configured to extract one or more image frames successively in time, wherein a first image frame is received before a second image frame in time; and
a non-transitory computer-readable storage medium storing instructions, which in response to execution by the processor, cause the processor to:

define one or more blocks in each of the one or more image frames, wherein the first image frame includes a first block, and the second image frame includes a second block;

in response to the second block having a probability higher than a threshold to be associated with the ROI, select the second block from the one or more blocks in the second image frame;

in response to the selected second block being associated with the first block, determine an ROI status of the second block to represent whether the second block includes any part of the ROI based on an ROI status of the first block; and in response to the selected second block not being associated with the first block, determine the ROI status of the second block with an object recognition approach via a multi-layer neural network.

18. The apparatus of claim 17, wherein the first image frame and the second image frame belong to a first group, and the processor is further configured to define the first block in the first image frame to be larger in size than the second block in the second image frame.

19. The apparatus of claim 18, wherein the processor is configured to determine whether the selected second block is associated with the first block based on whether a physical location of the selected second block in the second image frame matches a physical location of the first block in the first image frame and whether the second block is fully covered by the first block.

* * * * *